Patented June 20, 1944

2,351,832

UNITED STATES PATENT OFFICE 2,351,832

DEODORIZED OIL

Ralph H. Neal, Jersey City, N. J., assignor, by mesne assignments, to The Best Foods, Inc., New York, N. Y., a corporation of New Jersey No Drawing. Application January 8, 1941, Serial No. 373,604

9 Claims. (Cl. 260—409)

This invention relates to the production of a deodorized oil and more particularly to the deodorization of an oil not generally useful as an edible oil because of its unpalatable flavor and odor, such oils usually having a relatively high iodin number and having a raw grassy or hay-like flavor and odor, such, for example, as soya bean oil and linseed oil, or a fishy flavor or odor.

Soya bean oil and other oils having a raw grassy or hay-like flavor and odor, sometimes referred to as a painty flavor or odor because of its association with oils commonly used in the preparation of paints, are not suitable as edible oils because of this flavor or odor and cannot be readily deodorized to produce a satisfactory edible oil. The physical and chemical treatments normally applied in the deodorization of other vegetable oils will not accomplish the deodorization of such oils to such an extent that they may be used as edible oils and the hydrogenation of such oils makes them even more difficult to deodorize.

It is an object of this invention to provide an improved method for deodorizing soya bean and other unpalatable oils. A further object is to produce a deodorized oil from soya bean and other similar oils of high iodin number having a grassy, painty, or fishy flavor, which deodorized oil is edible and may be used in the preparation of margarine, shortening, salad oil and for other purposes for which edible oils are commonly used. Other objects will become apparent.

It has now been found that such objectionable flavors and odors are associated with or result from a small proportion of unsaponifiable matter in the oil and that by deodorizing the oil with a relatively large quantity of dry steam under reduced pressures and at temperatures above those normally used for the deodorization of vegetable oils, the grassy or painty odor and flavor can be completely removed and the product made suitable for use as an edible oil.

In the description of the invention, reference will be made to the treatment of soya bean oil, although it is not intended to restrict the invention to this particular oil, since it may also be applied to other oils of high iodin number and having a raw grassy, painty or fishy flavor.

The raw, crude soya bean oil may be subjected to the conventional alkali refining, that is, by heating it and then adding sodium or potassium hydroxide and maintaining it at 150° to 180° F. until a good "break" in the oil is obtained. In this operation the free fatty acid content of the oil is reduced to about .01 to .10% free fatty acid, based upon the total weight of the oil. After this treatment the soap resulting from the alkali refining is removed and the oil may be bleached in the usual manner, such, for example, as by filtering the oil and then bleaching it with fuller's earth or with adsorbent carbon.

The resulting oil may then be hydrogenated, preferably with a nickel catalyst or a nickel-copper catalyst as described in the Borkowski et al. Patent No. 2,320,063, and then deodorized, or, if desired, it may be subjected to the deodorization process without or before hydrogenation, depending upon the use to which the product is to be put. If the oil is first hydrogenated, it should be filtered to remove the catalyst before the deodorizing, and, since filtering of the oil aerates it, it is desirable to cool it from the hydrogenation temperature of about 130 to 200° C. down to about 75° to 90° C. before filtering in order to reduce the oxidation. Since soya bean oil and the other oils with which the present invention is concerned are oils of relatively high iodin number, and so readily susceptible to oxidation, this step is of importance.

The oil to be deodorized is placed in a closed kettle or deodorizer and dry steam is passed through it at a temperature of about 250 to 275° C. It is preferred to operate in the upper portion of this range and good results have been obtained at temperatures of 300° C. or over, although the distillation losses were somewhat higher. The oil is maintained at the elevated temperature for about two to five hours or longer, depending upon the flavor and odor standard required and the flavor and odor of the oil treated. During the heating and passage of steam through the oil, it is preferably maintained under a very high vacuum. It is preferred that this vacuum be such that the absolute pressure is less than about 10 millimeters of mercury, for instance, 5 to 10 millimeters, although somewhat higher pressures, for example, 20 millimeters, may be used.

After the oil has been maintained at this temperature and reduced pressure for two to five hours, the heating may be continued at the elevated temperature or it may be reduced to lower temperatures, such, for example, as those normally used in the deodorization of vegetable oils (210 to 230° C.). The heating at this lower temperature may be continued for two to five hours under the same vacuum and while continuing the passage of the steam. If the temperature is continued at the higher temperature, a shorter time will be required for the completion of the deodorization.

After the treatment, the oil is preferably cooled under vacuum to below about 95° C.

It is desirable to have a relatively heavy flow of dry steam through the oil while it is maintained at the elevated temperatures. For example, this should be not less than about 1 part of total steam (measured as volume of condensed water) to 3 parts of oil and may go as high as 1 part to 1 or higher. The volume of the steam is important, and the combination of the relatively low pressure and the quantity of steam used provides this large volume of steam. With a higher or lower pressure, more or less steam, respectively, may be used.

The deodorized oil resulting from this treatment may be used directly and in the usual way in the preparation of margarine, shortening, salad oil, or for other common uses of edible oils.

By using this improved procedure, oils having a relatively high content of glycerides of linoleic acid and which oils may be processed to result in an oil having improved characteristics, for example, for producing a margarine oil, may be deodorized to a flavor which is satisfactory for its intended use. Thus an oil may be obtained having a lower melting point for the same setting point (i. e., an oil in which the setting and melting points are closer together), such an oil making it possible to produce a margarine that will stand up well at normal table temperatures and that will have a lower melting point so that it will have proper mouthing qualities and will not be unduly hard and brittle at normal ice box temperatures.

In carrying out the procedure, unsaponifiable materials, apparently high molecular weight fatty sterols, are distilled off in removing the objectionable odor and flavor. In the procedure described a higher percentage of unsaponifiable matter is distilled off than in the deodorization of oils normally used as edible oils. With such normal edible oils a lower percentage of the oil is distilled and the distillate contains a lower percentage of unsaponifiable material. In the deodorizing of soya bean oil, the amount of unsaponifiable material distilled over may be as much as .3 to .6% of the total weight of the oil treated, or 30 to 60% of the total unsaponifiable matter in the oil treated, which apparently accounts for the loss in objectionable odor and flavor. For example, in the treatment described, 50% or more of the unsaponifiable matter in the oil may be removed as compared with no substantial removal at the usual temperatures used in deodorizing vegetable oils.

As a specific example of the process, a refined and bleached soya bean oil having the following characteristics:

| | |
|---|---|
| Iodin number (Wijs) | 130.5 |
| Saponification number | 191.4 |
| Free fatty acids per cent | .05 |
| Color (Lovibond) | 35.0 Y 8.5 R | was hydrogenated to give an oil having the following constants:

| | |
|---|---|
| Melting point °F | 96.9 |
| Setting point °C | 27.5 |
| Iodin number (Wijs) | 71.7 |
| Free fatty acids per cent | .08 |
| Color (Lovibond) | 10.0 Y 1.0 R |
| Unsaponifiable matter per cent | 0.8 |

Ten pounds of this hydrogenated oil was deodorized as described above in a stainless steel kettle at 275±5° C. for five hours under an absolute pressure of 5 to 7 mm. of mercury, four pounds of dry steam being bubbled through it at a substantially uniform rate during this period.

The deodorized oil had a free fatty acid content of .01%, a color of 6.0 Y 0.8 R and 0.4% unsaponifiable matter. The same oil, treated by the same deodorization process except at 225°±5° C., had a free fatty acid content of .01%, a color of 4.0 Y 0.6 R and 0.8% unsaponifiable matter.

The procedure used in determining unsaponifiable matter in the above tests is the standard method of the Association of Official Agricultural Chemists, as reported in the 5th edition of their Methods of Analysis (1940), chapter 31, section 39, pages 438–439.

Although particular examples have been given of the procedure and preferred temperatures, pressures, etc., recited, it is not intended to limit the invention to the examples given, it being apparent that many variations may be made in those details and that the procedure may be applied to other oils and in doing so may require variations in the preferred conditions. For example, the procedure may also be applied to the deodorizing of linseed oil and sunflower oil, and also may be useful in the deodorizing of other oils normally used as paint oils and particularly to oils having a relatively high concentration of lecithin in the crude state. Or it may be applied to mixtures of such oils or to mixtures of such oils with edible oils, such as cottonseed oil, peanut oil, coconut oil, palm kernel oil, etc.

Also, although it is preferred to follow the procedure described above, the order of the various refining steps may be altered. For example, the removal of the unsaponifiable material giving the objectionable flavor or odor may precede some or all of the various refining steps to which the oil is to be subjected. Furthermore, other refining steps or procedures may be used with the deodorization in place of those referred to above.

The terms used in describing the invention have been used in their descriptive sense and not as terms of limitation and it is intended that all equivalents of the terms used be included within the scope of the appended claims.

I claim:

1. A method for deodorizing an alkali refined glyceride oil of the class consisting of soya bean oil, linseed oil and sunflower oil, comprising passing dry steam through the oil while maintained at a temperature within the range of about 250 to 350° C. under an absolute pressure of less than 20 mm. of mercury to remove about 30 to 60% of the unsaponifiable matter in the oil.

2. In the preparation of an edible oil from an oil of the class consisting of soya bean oil, linseed oil and sunflower oil, the steps comprising alkali refining the oil to reduce the free fatty acids to about .01 to .10%, separating the soap formed thereby and passing dry steam through the oil while maintained at a temperature of about 250 to 300° C. and at an absolute pressure of less than about 20 mm. of mercury to remove at least about 30% of the unsaponifiable matter.

3. In the preparation of an edible oil from an oil of the class consisting of soya bean oil and linseed oil and sunflower oil, the steps comprising alkali refining the oil to remove free fatty acids and thereafter passing dry steam through the oil while maintained at a temperature of about 250 to 300° C. under an absolute pressure of less than about 10 mm. of mercury to remove at least about 30% of the unsaponifiable matter.

4. A method for preparing an edible oil from an oil of the class consisting of soya bean oil, linseed oil and sunflower oil, comprising subjecting the oil to an alkali refining to reduce the free fatty acids to about .01 to .10%, separating the soap formed thereby, bleaching the oil and passing dry steam through the oil while maintaining it at a temperature of about 250 to 300° C. and a reduced pressure of not over about 20 mm. of mercury to distil off about .3 to .6% of unsaponifiable material based on the entire mass of the oil.

5. A method for preparing an edible oil from soya bean oil, comprising subjecting the oil to an alkali refining to reduce the free fatty acids to about .01 to .10%, separating the soap resulting therefrom, and passing dry steam through the oil for at least about 2 hours while maintaining it at a temperature of about 250 to 275° C. and under a reduced pressure of less than about 10 mm. of mercury.

6. A method for preparing an edible oil from soya bean oil, comprising subjecting the oil to an alkali refining to reduce the free fatty acids to about .01 to .10%, separating the soap resulting therefrom, bleaching the oil, hydrogenating it in the presence of a metallic catalyst, cooling to below about 90° C., separating the catalyst, and passing dry steam through the oil for at least about 2 hours while maintaining it at a temperature of about 250 to 275° C., and under a reduced pressure of about 5 to 10 mm. of mercury.

7. A method for preparing an edible oil from soya bean oil, comprising subjecting the oil to an alkali refining to reduce the free fatty acids to about .01 to .10%, separating the soap resulting therefrom, passing dry steam through the oil at the rate of not less than about 1 part of steam (measured by volume as condensed water) to 3 parts of oil while maintained at a temperature of about 250 to 300° C. and a reduced pressure of not over about 20 mm. of mercury for about 2 to 5 hours, reducing the temperature to about 200 to 230° C. and continuing the passage of steam for about 2 to 5 hours.

8. A method for preparing an edible oil from soya bean oil, comprising subjecting the oil to an alkali refining to reduce the free fatty acids to about .01 to .10%, separating the soap resulting therefrom, bleaching the oil and hydrogenating it in the presence of a nickel catalyst, cooling the oil to not over about 90° C., filtering out the catalyst, passing dry steam through the oil at the rate of not less than about 1 part of steam (measured by volume as condensed water) to 3 parts of oil while maintained at a temperature of about 250 to 300° C. and a reduced pressure of not over about 20 mm. of mercury for about 2 to 5 hours, reducing the temperature to about 200 to 230° C. and continuing the passage of steam for about 2 to 5 hours.

9. A process of deodorizing an alkali refined oil of the class consisting of soya bean oil, linseed oil and sunflower oil comprising passing sufficient dry steam through the oil while maintained at a temperature of about 250 to 300° C. and at an absolute pressure less than 20 mm. of mercury to distil off a substantial percentage of the unsaponifiable matter in said oil.

RALPH H. NEAL.